United States Patent [19]

Kjell

[11] Patent Number: 4,622,731
[45] Date of Patent: Nov. 18, 1986

[54] METHOD FOR THE PRODUCTION OF A HUB FOR A SPOKE-WHEEL

[75] Inventor: Sven-Inge Kjell, Anderstorp, Sweden
[73] Assignee: Enco Miljö Försäljning AB, Anderstorp, Sweden
[21] Appl. No.: 598,345
[22] PCT Filed: Jul. 4, 1983
[86] PCT No.: PCT/SE83/00270
§ 371 Date: Feb. 27, 1984
§ 102(e) Date: Feb. 27, 1984
[87] PCT Pub. No.: WO84/00327
PCT Pub. Date: Feb. 2, 1984

[30] Foreign Application Priority Data
Jul. 12, 1982 [SE] Sweden .................. 8204271
Nov. 29, 1982 [SE] Sweden .................. 8206791

[51] Int. Cl.⁴ .................................... B21K 1/40
[52] U.S. Cl. ......................... 29/159.3; 264/273; 264/322.12; 301/105 R; 301/63 PW
[58] Field of Search ........... 29/159.3, 159.1, 159.01; 264/328.12, 273, 274, 250; 301/105 B, 105 R, 63 PW, 63 DD, 64 SH

[56] References Cited
U.S. PATENT DOCUMENTS
1,748,452 2/1930 Martins ..................... 29/159 R
4,193,639 3/1980 Pauly et al. ............... 301/63 PW
4,295,256 10/1981 Paschl ...................... 29/159.01

FOREIGN PATENT DOCUMENTS
309683 3/1931 Canada .
280813 9/1978 Fed. Rep. of Germany ........ 301/63 PW
402583 12/1933 United Kingdom .
698486 10/1953 United Kingdom ............... 264/273
722732 1/1955 United Kingdom .
1240377 7/1971 United Kingdom .

Primary Examiner—Mark Rosenbaum
Assistant Examiner—P. W. Echols
Attorney, Agent, or Firm—Burns, Doane, Swecker & Mathis

[57] ABSTRACT

Method for the rational and cheap manufacture of a high-strength, high-precision hub for a spoke-wheel, mainly for the use in a wheel chair, the hub being given, by means of injection molding of a plastic material, a central part (1) having at each of its ends a flange (2) to co-operate the spokes and a seat (5) for receiving ball-bearings. The method is characterized by forming, during the injection molding, openings (4) for receiving the spokes as depressions not extending through the flanges (2) of the hub, and subsequently, after completing the injection molding, producing the openings. Further, the hub is molded as two separate parts (6, 7) having one flange (2) each, the parts being connected to each other after the injection molding. The final length in its axial direction is adjusted by placing an insert (18) into the connection area between the two parts.

20 Claims, 6 Drawing Figures

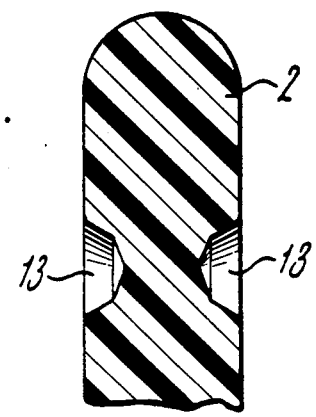
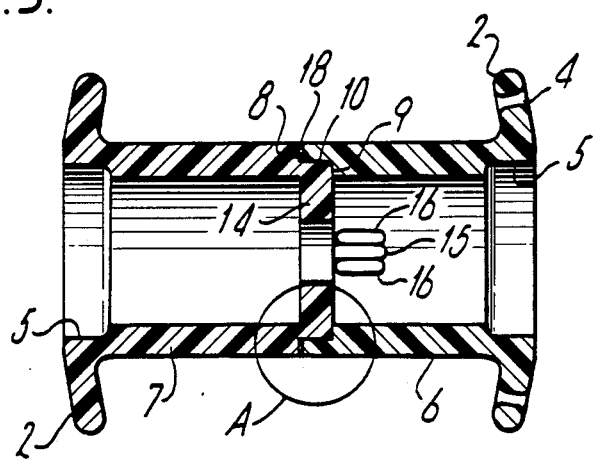
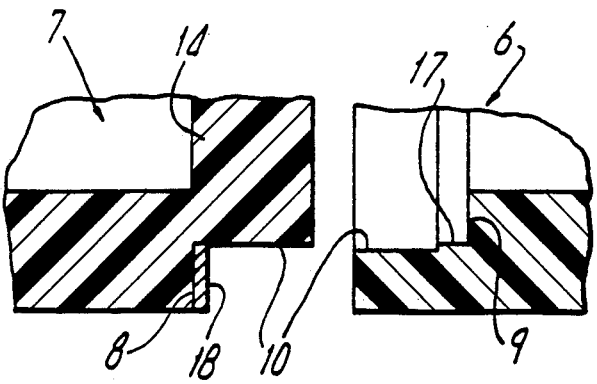

METHOD FOR THE PRODUCTION OF A HUB FOR A SPOKE-WHEEL

TECHNICAL FIELD

The present invention relates to a method for the production of a hub for a spoke-wheel, particularly of the kind intended for use in a wheelchair.

When manufacturing a hub for a spoke-wheel, the conventional technique is to manufacture the hub of metal in such a manner that the hub is given a tube-shaped central part with flanges at both ends. These flanges have holes for securing of the spokes. When hubs are manufactured for bicycles these hubs are produced in large series, therefore the tooling cost for them is of lesser importance.

For bicycle hubs and for hubs in similar two-wheeled vehicles the bearings of the wheel axles are often designed in such a manner that the tube-shaped central portion of the hub is provided with bearing cups being open towards the ends of the hub, such bearing cups receiving often without ball races a number of ball-bearing balls. The wheel axles pass through and are threaded; they have screwed-on bearing bodies that are approximately conical, which work together with the balls installed in the cups and which are held there by means of check-nuts. This design is simple and cheap to manufacture, but is less suitable, for example, in a wheelchair. The situation is that a wheel in a two-wheeled vehicle is subjected to radial stresses only, while the stresses in the axial direction may be completely disregarded. However, in a wheelchair, considerable axial stresses often occur. Thus, the bearing design used in a bicycle hub cannot be used in a hub intended for a wheelchair. This, in turn, entails that one cannot use this manufacturing method and benefit from the low manufacturing prices of a bicycle hub.

In a wheelchair wheel the axle-bearing usually includes a through-going axle with deep groove bearings which are pressed into a collar-equipped bearing-seat of the hub. Assuming that the ball-bearings are properly adjusted they can when carrying heavy loads, both axial and radial, achieve a long working life. However, a careless or even wrong assembly may cause axial stress in the bearing and strongly deteriorate the operation of the bearings and quickly destroy them. A very high precision is required both in the axle, in the possible collars upon the axle, as well as in the hub and its bearing-seats. Manufacturing of a special hub for a wheelchair must take place in relatively short series, with the result that the prices will be very high. It is therefore natural to look for new methods, when we are concerned with the choice of a design and material for a wheelchair hub.

With appearance on the market of new high-resistant plastics it appears attractive to try to produce a wheelchair hub of such a plastic material. The problem here is, however, the design of the hub, which when manufactured by means of injection molding necessitates the use of highly complicated and therefore very expensive tools.

Furthermore the stress upon a hub used in a wheelchair can often be very high, therefore extremely high requirements must be set forth both in respect to the design of the hub and to the methods used in its manufacture. Particularly heavy resistance problems can be encountered in flanges with holes serving for attachment of spokes to the hub.

As indicated above the precision in a hub can also be critical, if the required bearing function must be satisfied. Among special problems here are the shrinkage phenomena that take place in certain plastics. Therefore it is hardly possible in a hub produced of plastic to ensure an absolutely accurate distance between the collar-surfaces which determine the axial position of the ball-bearings in the bearing-seat. Some after-adjustments are therefore normal.

TECHNICAL PROBLEM AND OBJECT

It is an object of the present invention to provide a method for manufacturing a hub, which is intended to be used in a wheelchair and which may be produced having the required strength and precision without high tooling cost, mainly by the injection molding process.

TECHNICAL SOLUTION

This purpose is achieved according to the invention by a method, in which the hub is produced by injection molding providing a central part with a flange at each end to receive the spokes and the openings for the spokes are then made in the flanges in a step following the injection molding. Particularly good advantages are achieved, in respect to simple and inexpensive molding tools and high precision, when the hub is produced by injection molding in two parts, each with a flange. These two parts are joined after the injection molding and the final length of the hub's axial direction is adjusted by placing an insert in the connection area.

BRIEF DESCRIPTION OF THE DRAWINGS

The invention will now be further described with reference to the attached drawings, showing two exemplary embodiments of the hub produced in accordance with the invention.

FIG. 4 shows, on a larger scale, a partial section through the flange at a point having a hole to receive a spoke;

FIG. 5 shows a modified embodiment of a hub produced according to the invention;

FIG. 6 shows, on a larger scale, the area A in FIG. 5 before the hub's parts are joined.

DESCRIPTION OF PREFERRED EMBODIMENTS

Figure 1:
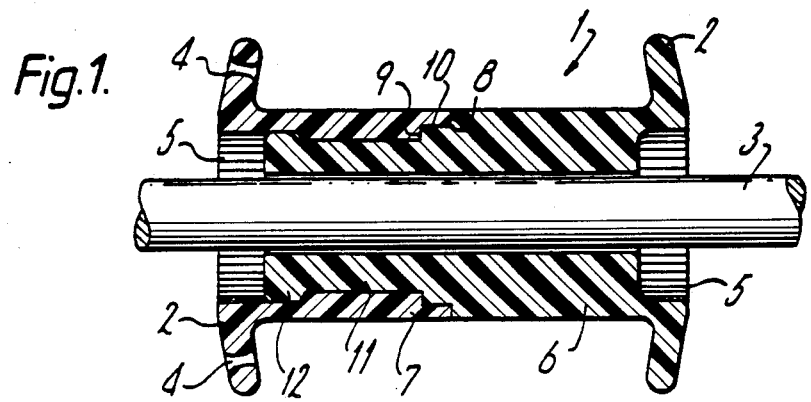
FIG. 1 shows a section along the points A—A in FIG. 3.

As seen from the drawings, the hub has a tubular central part 1, which has flanges 2 at both ends. In the completed state of the hub, the flanges 2 have passages 4 for receiving wheel spokes. Through the hub extends the axle 3 which, in the areas of the flanges 2, is provided with appropriate ground portions for receiving the ball-bearings, suitably of a permanently oiled and sealed type and designed for supporting heavy axial stresses. If desired, axle 3 can also have collars against which the ball-bearings are abutted during the assembly. The ball-bearings are further received in bearing seats 5 at the ends of the tube-shaped central part 1. Each bearing seat is provided, at its axially inner end, with a collar which, with the bearing in place, lies against the outer ring of the same.

According to the invention the hub is designed to be produced by injection molding from a high-resistant plastic (an acetal or a polyamid plastic material), which may have its material properties improved by addition of certain types of filling material, for example, glass balls or glass fibres. To avoid bending stresses in the flanges 2 it is expedient that the latter are not perfectly radial, but are positioned in the longitudinal direction of the spokes. This together with the provision of the through-going channel in the tube-shaped central part and the bearing seats and the openings 4 for the installation of the spokes results in that a very expensive and complicated injection molding tooling is required if the hub is designed in a single piece. Injection molding tooling for the manufacture of a hub in one single piece must be equipped with sliding backs, if the clearance of the finished product is to be achieved.

Therefore it is expedient that the hub is manufactured in two halves or parts 6 and 7, which after the injection molding, are to be put together. In the design shown in the drawings FIGS. 1–3, the line of separation used for the hub is approximately in the middle of the tube-shaped central part. In this division plan both halves 6 and 7 of the central part have connection surfaces 8 touching each other, the latter are situated in a radial plan to the tube-shaped central part. Furthermore, the two halves 6 and 7 have interior contact surfaces 8 and 9, which also are radially oriented. These two annular contact surfaces 8, 9 are interconnected by a cylindrical contact surface 10, which in the radial direction is placed approximately in the middle of the thickness of the tubular central part. As the spokes, which are attached to the flanges 2, when tightened, generate a power which axially presses the two halves 6 and 7 of the tube-shaped central part 1 together, no other connection of the halves is required besides the one obtained by means of the said contact surfaces. A further holding effect for the two halves 6 and 7 of the hub, may be achieved if the axle supporting the ball-bearing is given a tight fit in the bearing and the latter, in its turn, has a tight fit in the bearing seats 5. The collars and similar can also have the same effect.

To facilitate the handling of the hub during its assembly and also to achieve extra security the half 6 can be equipped with an axially directed finger 11, which extends into the second half 7 and at its free end has a projection 12 which may be locked into a corresponding recess in the other half. Furthermore, it is expedient that the fingers 11 themselves are placed into the axially directed recesses inside the second half 7, thus ensuring a fixation of the two halves around the central axis of the hub. The situation is actually that the openings 4 for the spokes must be oriented in such a manner that the openings in the one flange are located between the openings in the other flange. By the provision of the longitudinally directed groove for the interaction with the fingers, a secure fixation of the position is caused in the direction of rotation of the parts 6 and 7 in respect to each other.

The above-described design of the hub may be produced by means of simple injection tooling, which does not require any movable cores, backs or similar parts. The parting line of this tooling is expediently placed in a plane which contains the periphery of the flange 2.

Regardless of which final design the hub is given, with the above-described tooling one should be able, without the use of any movable parts that will increase the cost, simply produce the openings 4 in the flanges at the same time as one produced the hub-halves 6 and 7. Regardless that this should be a very rational production step, in practice one cannot use such a procedure, since an insufficient strength in the peripheral part of the flanges, mainly outside of the openings 4 may originate, where the stress and possibly also the wear by the spokes is greatest.

According to the invention one has chosen instead, that during the injection molding the flanges are given the appearance shown in FIG. 4. The flanges are provided with depressions 13 which are shaped approximately as truncated cones. These recesses are aligned opposite each other in positions where the openings 4 are to be located in the completed flanges 2.

The transition areas between the recesses and the surrounding parts of the flanges can here expediently also be given a smooth rounded contour, which possibly can also apply to the bottoms of the recesses. However, its centre should be marked in order to facilitate a subsequent perforation.

In a practical design the body thickness of the flanges 4 is, for example, 5 millimeters, while each recess has a depth of 1 to 1.5 millimeters. The material part between the bottom of the recesses should have a thickness of 1 to 2 millimeters.

When the injection molding process is finished and the hub is aged the holes 4 for the spokes are produced preferably by a drilling or cutting operation on a multiple spindle drill. In this operation the size of the holes and also the shape is adjusted according to the dimensions and design of the spokes that are to be placed into the holes of the hub. Then the two parts of the hub 6 and 7 are joined together into one unit.

As an alternative to the above-mentioned drilling or cutting operation the holes 4 may be made by a pressing procedure. Possibly it should be also possible to use a heated tool for the punching of the hole so that the hole would be completely or partly molten away.

Naturally, it is also possible to make the holes after that the hub would be produced in a single piece. It is self-evident that this method also applies if the parts of the hub are produced separately and later joined together.

The design shown in the drawings in FIGS. 5 and 6 has the same form on the flanges as described above. After the injection molding procedure, this design has on the opposite sides of the flanges, recesses 13 arranged opposite each other. In the same way as described above, with the starting point at these recesses the holes 4, which are to serve for securing the spokes, are opened.

Even if the above-described design of the hub with projecting, axially directed fingers 11 and with corresponding receiving recesses to hold together the two halves of the hub, may be fully sufficient in many situations, however, in certain cases a permanent joining of the two parts of the hub 6 and 7 is to be preferred. Furthermore the precision which may easily occur with the described design may in certain situations be unsatisfactory, when we deal with the axial distance between the collars provided in the bearing seats for abutting the ball bearings. To further improve the hub in accordance with the invention and the manufacture thereof the hub may be given the form appearing in FIGS. 5 and 6.

In this design the hub is produced in two separate parts 6 and 7 respectively, in approximately the same way as described above, in other words, by means of the injection molding procedure. The two parts of the hub have radial contact surfaces 8 and 9, as well as the intermediate contact surface 10. As distinguished from the above described embodiment the one part 7 of the tubular central part has a transverse wall 14 with a hole. This wall is arranged in the area of the surrounding contact surface 10. At the periphery of this wall at least two projecting guiding heads 15 are arranged, which axially extend into the other part 6 of the tube-shaped central part 1. On each side of the guide heads 15 the other part 6 has guide heads 16. Thus, the two halves 6 and 7 of the central part are prevented from rotating in relation to each other.

FIG. 6 shows the connection area between the two halves 6 and 7 of the tube-shaped central part, before they are brought together in the axial direction. The one half 6 at the interior end of the surrounding contact surface 10 has a collar and a radially inwards-turned ring 17, which is calibrated in such a manner that its terminal edge comes to rest against the terminal surface of the transverse wall 14, when the two halves 6 and 7 are brought together in axial direction. The purpose with this radial ring 17 will be discussed below.

As mentioned above, because of certain shrinkage problems, qualitative differences in the plastic material and similar factors, it may be difficult to guarantee that the axial distance between the collar surfaces of the bearing seats 5 facing each other, will always be exactly the same, so that the fit and the axial stresses of the bearing may be kept within the predetermined limits. In order to adjust this axial distance, which can be easily controlled before the joining of the two halves 6 and 7, a metal ring 18 is used which is mounted against the radial contact surface 8 on the one half 7 of the central part. The thickness of this metal ring may be easily chosen in relation to the measured dimensions of the two parts 6 and 7.

The metal ring 18 in addition to the adjustment of the permissible variation, also has another important task, namely to hide the joint between the two parts 6 and 7 of the central part 1. Because the metal ring 18 is visible in the periphery of the hub, as the two halves are joined the connection can in no way be considered as offensive from the aesthetic point of view.

The mounting of the hub in the embodiment of FIGS. 5 and 6 takes place in such a manner that a welding joint is produced in the area at the surrounding contact surface 10 and the radial contact surface 9. This welding procedure is initiated by means of welding equipment, which is set against the transverse wall 14, which means that the path of the propagation which the ultrasound should cover from the tooling to the initial welding zone is short. The welding zone is initiated in the area for the sholder provided on the radially inward-turned ring 17 for facing the transverse wall 14 while pressing both parts 6 and 7 axially against each other simultaneously as the ultrasound is applied to the transverse wall 14. In this manner begins a local melting down of the material at the radially inward-turned ring 17 and then a more or less complete melting-together of the material takes place along the contact surfaces 9 and 10. Notwithstanding the axial pressure of the parts against one another during the welding process and notwithstanding the softening of the material which the welding entails, the hub, after the welding procedure, acquires a very well-defined length depending on the use of the metal ring 18 as the axial displacement and compression of the two parts is stopped by the contact between this metal ring 18 and the two radial contact surfaces 8 and 9, or at least the most peripheral parts of the same. Furthermore one may merely by means of a thickness adjustment of the metal ring 18 achieve compensation for such inadequate tolerances in the two plastic parts, which possibly have to be accepted after the injection molding.

In addition to the above-described function the metal ring 18 also has the important purpose of hiding the joint which cannot be avoided between the hub and the parts 6 and 7. This is produced simply by that the periphery of the metal ring 18 is visible in the periphery surface for the central part of the hub, thus all the irregularities, welding blobs and similar disappear since the welding procedure is not permitted to expand all the way out to the exterior periphery of the metal ring.

Figure 2:
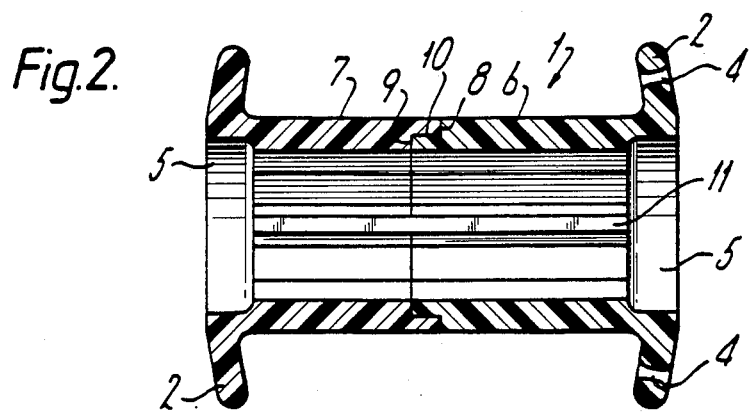
FIG. 2 shows a section along the points B—B in FIG. 3.
Figure 3:
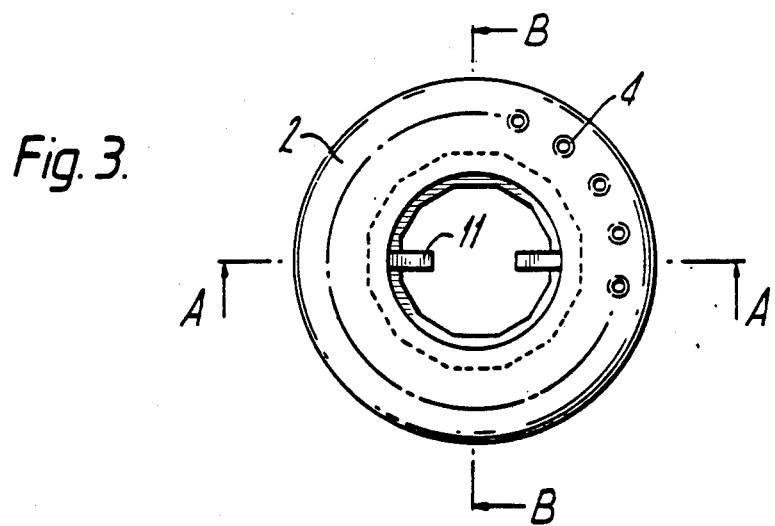
FIG. 3 shows an end view of a first embodiment of a hub produced according to the invention.

In an alternative version to the design shown in FIGS. 1-3, the central part 1 can be divided in approximately the same manner as shown for the contact surfaces 8, but otherwise has a screw-connection which replaces the contact surfaces 9 and 10, together with the fingers 11. Possibly a hub joined by such a screw-connection will be permanently connected in a glueing procedure, in which the glue is applied on the threads. Naturally the glueing may also be used in the design shown in FIGS. 1-3.

As an alternative for the described design of the contact surfaces 8-10, naturally also other alternative designs may come into consideration. Therefore, for example, the surfaces 8 and 9 do not have to be perfectly radial, but may be given a more or less conical shape. The same applies to the surrounding surface 10. Furthermore, one should be able to leave out one of the radial surfaces 8 and 9 if the surrounding surface 10 is conical. In these variations, too, both glueing, and welding, preferably ultrasonic welding, can be used in the joining of the two parts of the hub. One may naturally also use a metal ring 18 for the accurate determination of the hub's length.

The invention may be further modified within the scope of the following claims.

I claim:

1. A process of manufacturing a hub for a spoke wheel, said hub being made of two separate parts, each of said two parts being made from a plastic material by injection molding, said method comprising the steps of:
   providing a first separate part having a flange section at one end and a portion of a central section at the other end thereof;
   providing a second separate part having a flange section at one end and a portion of a central section at the other end thereof;
   providing an insert and placing said insert on one of said separate parts near said other end thereof;
   pressing said separate parts axially to each other until both the first and the second separate parts abut against the insert; and
   joining the first and second separate parts to each other at a joint to thereby form the hub having two flanges, one at each end, and a central part having a joint region adjacent the insert.

2. The process of claim 1 further comprising the step of producing in each flange openings for receiving spokes.

3. The process of claim 2 further comprising the step of providing, during the injection molding of the flanges, depressions at which spoke receiving openings can be produced later.

4. The process of claim 1, wherein said placing step places said insert at the exterior of said central part so as to be in a position visible at the exterior of the central part, said joint region substantially inside of said central part, whereby the joint region is substantially concealed.

5. A process of manufacturing a hub for a spoke wheel, said hub being made of two separate parts, each of said two parts being made from a plastic material by injection molding, said method comprising the step of:
providing a first separate part having a flange section at one end and a portion of a central section at the other end thereof;
providing a second separate part having a flange section at one end and a portion of a central section at the other end thereof;
providing an insert and placing said insert on one of said separate parts near said other end thereof;
pressing said separate parts axially to each other; and
joining the first and second separate parts by generating heat for softening and melting contacting portions of said first and second separate parts and further pressing said first and second separate parts against each other until both of said first and second separate parts abut said insert to thereby form the hub having two flanges, one at each end, and a central part having a joint region adjacent the insert.

6. The process of claim 5 further comprising the step of producing in each flange openings for receiving spokes.

7. The process of claim 5, wherein said placing step places said insert at the exterior of said central part so as to be in a position visible at the exterior of the central part, said joint region substantially inside of said central part, whereby the joint region is substantially concealed.

8. The process of claim 5, wherein said joining by generating heat step softens and melts radially extending contacting portions of said separate parts.

9. The process of claim 8, wherein said joining by generating heat step softens and melts also axially extending contacting portions of said separate parts.

10. The process of claim 9, wherein said joining step generates heat by applying ultra sound to said joint region and one of said separate parts includes a radially inwardly directed ring on said axially extending contacting portion for initiating ultra sound welding of said parts.

11. The process of claim 5, further comprising the step of:
circumferentially locating said separate parts by registering a projection on one of said separate parts with a recess on the other of said separate parts.

12. The process of claim 11 further comprising the step of producing in each flange openings for receiving spokes.

13. The process of claim 11, wherein said placing step places said insert in the joint region at a position visible at the exterior of the central part, to thereby conceal the joint region.

14. A hub for a spoke wheel, said hub comprising two parts of injection molded plastic material, said hub including a central part having, at each end thereof, a flange to co-operate with spokes, said parts including in a joint region axially extending joining surfaces and substantially radial joining surfaces, said hub further comprising an insert provided between opposing radial joining surfaces of said parts at which said parts are axially urged toward each other when joining said parts.

15. The hub of claim 14, wherein said insert is annular and has a central hole, and the axially extending joint surface of a first one of said parts extends through said central hole.

16. The hub of claim 15, wherein one of said parts includes a surface for initiating ultra sound welding between adjacent joining surfaces of said parts.

17. The hub of claim 14, wherein said parts include a projection on one of said parts and a recess on the other of said parts, said recess receiving said projection to circumferentially locate said parts.

18. The hub of claim 17, wherein said insert is annular and has a central hole, and the axially extending joining surface of a first one of said parts extends through said central hole.

19. The hub of claim 18, wherein one of said parts includes a surface for initiating ultra sound welding between adjacent joining surfaces of said parts.

20. The hub of claim 14, wherein said axially extending joining surface of a first one of said parts extends through said insert with a projecting surface for initiating an ultra sound welding being provided at said axially extending joining surfaces.

* * * * *